United States Patent [19]

Giddey et al.

[11] Patent Number: 4,578,278

[45] Date of Patent: Mar. 25, 1986

[54] LIGHTER FOODSTUFFS AND METHOD FOR PREPARATION OF SUCH PRODUCTS

[75] Inventors: Claude Giddey, Geneva; Georges Dove, Carouge, both of Switzerland

[73] Assignee: Battelle Memorial Institute, Geneva, Switzerland

[21] Appl. No.: 635,594

[22] Filed: Jul. 30, 1984

[30] Foreign Application Priority Data

Aug. 2, 1983 [CH] Switzerland ................ 4192/83

[51] Int. Cl.$^4$ .................. A23L 1/24; A23L 1/32
[52] U.S. Cl. ................. 426/605; 426/613; 426/589; 426/568; 426/573
[58] Field of Search ............ 426/605, 613, 568, 589, 426/573

[56] References Cited

U.S. PATENT DOCUMENTS

| | | | |
|---|---|---|---|
| 2,162,585 | 6/1939 | Musher | 426/605 |
| 2,217,699 | 10/1940 | Musher | 426/605 |
| 3,414,413 | 12/1968 | Levin | 426/605 |
| 3,728,133 | 4/1973 | Norris. | |
| 3,764,347 | 10/1973 | Katz | 426/605 |
| 4,420,495 | 12/1983 | Hammer et al. | 426/605 |

FOREIGN PATENT DOCUMENTS

| | | | |
|---|---|---|---|
| 0012490 | 6/1980 | European Pat. Off. | |
| 2360264 | 3/1978 | France. | |
| 7811439 | 5/1980 | Netherlands | 426/605 |
| A2078483 | 1/1982 | United Kingdom. | |

*Primary Examiner*—Jeanette M. Hunter
*Attorney, Agent, or Firm*—Cushman, Darby & Cushman

[57] ABSTRACT

Aerated foodstuff of "mayonnaise" type containing an oil-in-water emulsion of mayonnaise ingredients and coagulated whipped egg white in a foam of fine air or gas bubbles dispersed therein and containing a gelifying stabilizer.

9 Claims, 1 Drawing Figure

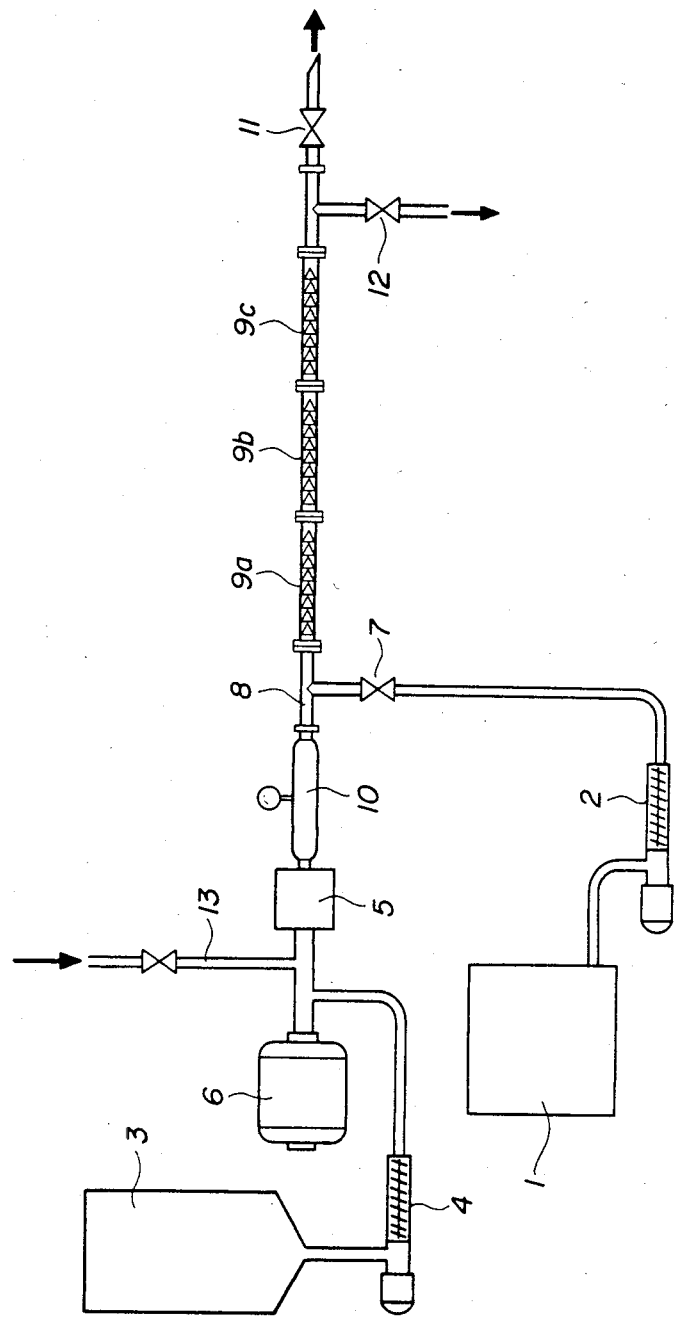

LIGHTER FOODSTUFFS AND METHOD FOR PREPARATION OF SUCH PRODUCTS

The present invention concerns lighter foodstuffs and especially emulsions of fatty substances in aqueous medium, for instance, products of the mayonnaise type.

In the foodstuff field, one defines by the term "mayonnaise" an emulsion of oil in an aqueous solution containing various edible additives whose oil weight proportion with regard to the rest of the composition is of at least 77%. For lower proportions, for instance from 77 to 64%, one speaks then of "mayonnaise sauce" and for values still lower, of "sauce" for short, being understood that the additives (for instance, seasonings, spices or others) can be used for defining the type of "sauce" under discussion (sauce tartare, sauce provencale, etc.). The present invention relates, in general, to these different foodstuffs of "mayonnaise" type, this definition being used hereafter for simplification.

The compositions of the "mayonnaise" type comprise oil, water, vinegar, an emulsifier exemplified by egg-yolk and, at will, various other seasoning additives such as salt, sugar, spices, flavors and other ingredients imparting taste characteristics to said composition. The egg-yolk is constituted by lipids, phospholipids and proteins and these two last constituents are responsible for the formation of an emulsion "oil-in-water" typical of the mayonnaises in which the oil droplets are separated from each other by the aqueous solution containing the emulsifying agents. Normally, the emulsion constitutive of a mayonnaise is obtained by vigorously whipping the aqueous solution of egg-yolk and progressively adding the oil. The other ingredients can be added, depending on the recipes, before or after emulsification.

The mayonnaise described above presents itself in the form of a mass of high viscosity, compact and with a density near 1. It sometimes lacks stability and on standing, part of the oil phase can separate from the emulsion which gives to the foodstuff a rather unpleasant look. This shortcoming is absent in the foodstuff of the invention. Besides, it was desirable to decrease the density of the mayonnaise by imparting thereto a lighter and aerated structure due to the presence of microbubbles of air or gas. In other words, one has sought to convert mayonnaise and related products into "foams" of mayonnaise with a storage stable and stiff texture.

Mayonnaise foams have been disclosed in the prior art and, for instance, in U.S. Pat. No. 3,728,133, one discloses mayonnaise foams comprising, as foaming agents, monoglycerides and fatty acid esters hydroxylated with partially hydrolyzed glycerides. However, such foams are rather difficult to prepare and lack stability. Besides, they do not present a strong texture analogous to that of a gel, this texture being one of the distinctive features of the invention.

Document U.S. Pat. No. 3,764,347 discloses a salad dressing of mayonnaise type without cholesterol, i.e. without egg-yolk. This dressing is composed of oil and starch and comprises an emulsifyer and a chelatant. The starch disclosed consists of a dough obtained by hydratation of a corn flour, of tapioca or other. In Example 2 of this document, one uses the following ingredients (by weight): starch dough (42.02); egg-white (5.64); alginate (0.1); EDTA (0.01); spices (3.19); vegetal oil (43.04); vinegar (1). After premixing the ingredients, the latter are put into a colloid mill which provides an emulsion whose aspect, taste and structure, are identical with that of a common mayonnaise. However there is no question of foam in this document.

Document GB-A-2.078.483 teaches an oilless composition having lubricating properties capable of replacing oil in foodstuffs such as salad dressings, mayonnaise, aerated desserts and others. One obtains this composition by mixing for instance a cellulose derivative (hydroxymethyl cellulose) with water and egg-white and whipping the mixture for incorporating air thereto to obtain a product A of density 0.7 or less.

Aside therefrom, one subjects a starch product to hydration and acidification at pH 3-6 (acetic acid or other) and, after gelatinization thereof (product B), one mixes under continuous stirring components A and B. One obtains thus the searched after product containing air bubbles trapped in the mass which impart thereto lubricative organoleptic properties. The Examples in this document illustrate the preparation of various foodstuffs such as salad dressing and ice-cream. It is however not indicated how it can be used for making mayonnaise. Although this document teaches that the addition of air bubbles impart oil-feel properties to a mixture of starch and egg-white, it does not teach mayonnaise foam since the main ingredient of mayonnaise, i.e. oil, is absent from the foodstuff.

The teaching of document U.S. Pat. No. 2,217,699 is in rather close relationship to that of the previous document. It discloses an aerated oilless dressing for salads, the gas bubbles therein being essentially intended to decrease the gluey properties of the foodstuff due to the starch product therein. This document neither teaches mayonnaise foams like in the present invention.

Document FR-A-2.360.264 discloses fruit and vegetable mousses which are prepared by adding beaten up egg-white to purees of fruits or vegetables. However, the document teaches temperatures not lower than 60° for adding the egg-white even in the case of acidic products. The method of the invention has therefore an advantage over this disclosure since no or very little heating is required which strongly minimizes the risk of collapse of the foam due to possible expansion, bursting of the gas bubbles under the effect of temperature and ultimate contraction be cooling.

Another document (EP-A-12490) concerns a composition to replace or reinforce the properties of beaten up egg-white in aerated foodstuffs. This composition based on gelatin, polyphosphate, and whey proteins is not quoted as usable for making mayonnaise foams.

The foodstuff of "mayonnaise" type of the present invention is also lightened by the presence of microbubbles of gas or air distributed homogeneously and imparting to the foodstuff the aspect of a stable foam of stiff texture. It is characterized, in addition to the usual components of mayonnaises and related products, by the presence of a gelifying stabilizer agent and of a lightening agent constituted by beaten up egg-white whose texture is reinforced by coagulation.

Among the usual constituents of mayonnaises, one can recite, besides oil and water and egg-yolk which are the essential constituents thereof, vinegar, salt, sweetening agents, flavors, spices, various seasoning agents such as, for instance, mustard, horse-radish, tomato concentrate, pepper, pimento, paprika, onion, garlic and others. Among the sweetening agents, one can recite sugar, glucose, dextrose, lactose, honey, corn syrup, etc. The oils which are convenient for the product of the invention belong to many kinds and comprise, for instance, oils of soy, peanuts, cotton, sunflower, rapeseed, grapestones and other edible oils.

As gelifying agent, one uses advantageously at least one of the following products: gelatin, pectin, alginates, carrageenates, agar, carob, starch and other thickening and gelifying materials. The useful proportion by weight of such gelifying agents relative to the total of the composition is, of preference, between 0.01 and 0.5%. Below this range, the effect has little significance or is even undepictable. Quantities over 0.5% are not impossible but, in general, are not advantageous unless special effects are sought; indeed, above 0.5%, the structure becomes exaggerately stiff which can be undesirable for eating.

As egg-white, one can use that of new-laid eggs or powdered eggs; one prefers powdered egg-white for practical reasons because wheighing up a dehydrated product provides more easily reproducible results than that of natural egg-white.

The proportions of beaten up egg-white, calculated as weight of solid egg-white (powder), relative to the remainder of the composition are, preferably, 0.4 to 0.6%; lower quantities (for instance 0.2–0.3% are not impossible but in general they do not impart to the mayonnaise foam sufficient lightening effect. Quantities above 0.6% are also possible (for instance for obtaining foams with a density below 0.6–0.7) but foams lightened to such a degree are much less stable than denser foams, for example with densities of 0.8 to 0.6, which are obtained from the aforementioned quantities of lightening agent. The coagulation of the egg-white albumin which imparts its stiffness to the lightening agent and, in part, its stability to the mayonnaise foam results from the action of the vinegar of the composition. This point will be reminded afterwards when describing the preparation of the foam.

Regarding the proportions of the other ingredients, the latter conform to practise in the field of mayonnaises and related products and have no particular impact on the above-mentioned proportions of gelifier and lightening agents. These proportions can therefore be freely chosen by the man skilled in the art in agreement with the recipes in usage and his experience as a practitioner.

The products of the invention present themselves in the form of an aerated mass of very fine taste and of highly appetizing aspect as compared with the original not yet lightened products. They have a light and foamy aspect with more or less visible bubbles, however combined with a remarkably stiff texture. The color is generally fainter than that of the original product and, in some cases, it may be advantageous to add to the composition a food-grade dyestuff in order to reinforce the color of the foam.

To fabricate the present foodstuffs, one starts with the preparation of a mayonnaise or similar product according to usual means and by using the usual ingredients, the gelifying agent being also added; then one incorporates thereto the beaten up egg-white between 17° and 27° C. When in contact with the vinegar, the egg-white rigidifies itself by coagulation and its structure aerated due to the presence of the air or gas bubbles is stabilized despite the mixing stress to which it is subjected upon agitating with the remainder of the composition. This effect is unexpected and constitutes one of the surprising features of the present invention. Another surprising feature is the storage stability of the present foam, the latter preserving itself perfectly for several weeks at 50° C. and, a fortiori, at room temperature without appreciable changes and without separation of part of the oil phase.

The temperature scale given above is markedly advantageous; indeed, below the above-given limits, the coagulation effect is too slow and the lightening effect is less significant, above the afore given limits, the foam thus obtained loses somewhat of its stability.

Regarding the preparation of the mayonnaise composition mentioned above, one may, before adding the egg-white, either (1) add the oil (under agitation) to the solution of the other ingredients, or (2) proceed identically, the vinegar being omitted in the solution and being added at the end of the preparation of the emulsion, or (3) add simultaneously but separately (under agitation) the oil and the vinegar to the other ingredients dissolved in water.

When one lightens the produced emulsion as indicated under (1), one obtains a more fluffy foam whose bubbles are well apparent; however it is less stiff than when the emulsion is prepared as indicated under (2) or (3).

The Examples that follow illustrate the invention in a detailed manner.

EXAMPLE 1

One has dissolved 0.3 g of gelatin in 7 g of water at 70° C. under stirring, then after allowing to cool down to 25° C., one has added to this solution 3.4 g of egg-yolk in powder form, 6.7 g of vinegar at 8°, 1.2 g of salt and 1 g of sugar. Under agitation by means of a cream beater, one has thereafter added streamwise 77 g of sunflower oil and one has agitated until a homogeneous emulsion is obtained.

Besides, one has beaten at room temperature a solution of 0.57 g of powdered egg-white in 3 g of water.

One has thereafter incorporated, under beating, the beaten up egg-white to the emulsion at 25° C. and one has poured the foamy mass into jars. After about 1 hr of rest, one has noted that the foam had stiffened and that its structure had become stiff. The mayonnaise foam thus prepared had a very fine taste although as strong as the starting emulsion. Its aspect was light, aerated and very appetizing (d=0.720).

EXAMPLE 2

One has proceeded as in Example 1 with the same ingredients but, in the starting aqueous solution, the vinegar was omitted. The latter was added to the emulsion once the latter was achieved, then one has proceeded to the incorporation of the beaten up egg-white as described in Example 1.

The foam obtained was even stiffer than that described in Example 1 and, once it had been introduced into a mold and turned out after "setting", it provided a mayonnaise foam "pudding" whose shape was stable (d=0.730).

EXAMPLE 3

One has proceeded like in Example 1 but with the following ingredients: carrageenan (LYGOMME) 0.1 g; water 7.1 g; powdered egg-yolk 3.5 g; vinegar 8° 6.4 g; salt 1.2 g; sugar 1.0 g; powdered egg-white 0.584 g dissolved in 2.916 g of water. After the introduction of the beaten egg-white, one has obtained an appetizing mayonnaise foam with an excellent taste (d=0.72).

EXAMPLE 4

One has prepared a mayonnaise sauce as follows: in an aqueous solution containing 3.4 g of egg-yolk in powder form, 7 g of water, 0.03 g of carrageenan and 16.07 g of tomato concentrate (at 80% of dry matter), one has added, separately but simultaneously under agitation at room temperature, 64 g of peanut oil and 6 g of 8° vinegar.

One has thereafter added to the resulting emulsion, at 20° C., beaten up egg-white prepared from 0.584 g of powdered egg-white dissolved in 2.916 g of water. One has thus obtained, after resting stored in jars, a mayonnaise sauce foam of pale red color having an aerated aspect and very agreeable to the taste.

EXAMPLE 5

For an improved comprehension of this Example, reference is made to the annexed drawing which schematically represents an industrial installation for the production of mayonnaise foam.

Said installation comports on one hand a mayonnaise injection circuit consisting of a storage container 1 for storing the unfoamed initially prepared mayonnaise foodstuff and a delivery pump 2 and, on the other hand, an egg-white solution injection circuit including a reactor 3 for the initial preparation of an albumin solution, a pump 4 for circulating this solution and a beater 5 or expanding head activated by a motor 6 for beating up this solution.

By means of a control valve 7 in the mayonnaise circuit, which enables to dispense a controlled amount of mayonnaise relative to the egg-white and a T shaped duct 8, one causes the two foodstuff streams to meet in correct relationship so that they penetrate together in a series of static mixers 9a, 9b and 9c. These still mixers comprise a plurality of fixed baffles arranged for causing the stream mayonnaise and beaten up egg-white components to intimately interpenetrate and intermix and provide a homogeneous mass of mayonnaise foam.

The installation further comprises a back-pressure check tube 10 connected to the circuit to control the allowed inside pressure and release overpressures, a valve 11 for directing the foam into a conditioning machine (not shown) for filling jars with the mayonnaise foam and a side valve 12 for sampling from time to time the mayonnaise foam under continuous production, the samples being subjected to analysis. The installation further comprises a gas introduction line 13 for adding a pressurized inert gas like $N_2$ in order to achieve the foaming and the mixing under an inert atmosphere.

Using the presently disclosed installation, one has introduced a previously prepared mayonnaise charge into tank 1; this mayonnaise was prepared by usual means with the following ingredients:

| Ingredients | Parts by weight |
| --- | --- |
| sunflower oil | 75 |
| powdered egg-yolk | 3.5 |
| vinegar | 6.7 |
| water | 9.015 |
| salt | 1.2 |
| sugar | 1 |
| gelatin (230 Bloom) | 0.2 |
| Total | 96.615 |

Aside from this, one has prepared in reactor 3 a solution of powdered egg-white in water at 16.7% by weight. Then, by means of the pumps 2 and 4, one circulates the mayonnaise in direction of meet point 8 and the egg-white solution in the direction of the expanding head 5, respectively, in the following proportions: 96.615 parts by weight of mayonnaise and 3.385 parts by weight of the egg-white solution. The nitrogen pressure in line 13 is 7 bar and the operating pressure in the installation is 2.1 bar. After beating up in the head 5 and passing through tube 10, the beaten up egg-white and mayonnaise streams meet at point 8 and intermix in static mixers 9a to 9c to provide a mayonnaise foam of density about 0.73.

Under the operating conditions set up below, the continuous production of this foam is about 280 kg/hr which enables to fill approximately 700 jars of 400 g each.

Said operating conditions are as follows:

Back pressure 2.1 bar; nitrogen consumption 9 l/min; albumin solution flow rate 10.8 kg/hr; temperature 20°–22° C.; density of the albumin solution 1.030; density of the beaten up egg-white 0.075.

The present installation was built up using elements fabricated by MONDOMIX, Nederhorst, Holland. By making slight variations to the above mentioned operating parameters, mayonnaise foams with densities of 0.68 to 0.75 were obtained having excellent organoleptic and storage properties.

We claim:

1. An aerated mayonnaise type foodstuff comprising a foam of microbubbles of gas or air in an oil-in-water emulsion of oil, water, egg yolk, vinegar, seasoning, a gelifying stabilizer and coagulated whipped egg white.

2. Foodstuff according to claim 1, wherein the gelifying agent is selected from the group consisting of gelatin, pectin, alginates, carrageenates, agar, carob polysaccharides and starch.

3. Foodstuff according to claim 2, wherein the % by weight of gelifying agent relative to the foodstuff is from 0.01 to 0.5%.

4. Foodstuff according to claim 3, wherein the weight of egg-white relative to the foodstuff is 0.4 to 0.6%.

5. Foodstuff according to claim 1, the stability of said foodstuff being such that no separation of any oil phase is observable on storage at 50° C. in excess of 10 weeks.

6. A method of preparing a foodstuff according to claim 1 which comprises whipping together an oil-in-water emulsion of oil, water, egg yolk, vinegar, seasoning, gelifying stabilizer and whipped egg-white and allowing the resulting mass to rigidify.

7. A method according to claim 6 wherein the emulsion is prepared by mixing together all of the foodstuff components except for the egg-white and the egg-white is thereafter added and the resulting mixture is beaten and then allowed to rigidify.

8. A method according to claim 6 wherein the emulsion is prepared by adding the vinegar and oil simultaneously but separately to an aqueous solution of the other components and the mixture is beaten and allowed to rigidify.

9. A method according to claim 6 which is carried out continuously by feeding separate streams of (1) an aqueous solution of the whipped egg-white and (2) an oil composition containing the other components through a series of baffles which intimately mix (1) and (2) together to provide a foam of density 0.68 to 0.75 g/cm³.

* * * * *